United States Patent
Basehore et al.

(10) Patent No.: US 10,503,261 B2
(45) Date of Patent: Dec. 10, 2019

(54) MULTI-POINT FEEDBACK CONTROL FOR TOUCHPADS

(71) Applicant: Google LLC, Mountain View, CA (US)

(72) Inventors: Derek Basehore, San Francisco, CA (US); Nicholas Jordan Sanders, Saratoga, CA (US); Gregory Granito, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 138 days.

(21) Appl. No.: 15/844,322

(22) Filed: Dec. 15, 2017

(65) Prior Publication Data

US 2019/0187792 A1   Jun. 20, 2019

(51) Int. Cl.
*G06F 3/01* (2006.01)
*G06F 3/041* (2006.01)
(Continued)

(52) U.S. Cl.
CPC .............. *G06F 3/016* (2013.01); *G06F 3/017* (2013.01); *G06F 3/044* (2013.01); *G06F 3/0436* (2013.01); *G06F 1/169* (2013.01); *G06F 1/1613* (2013.01); *G06F 1/1692* (2013.01); *G06F 3/038* (2013.01); *G06F 3/0412* (2013.01);
(Continued)

(58) Field of Classification Search
CPC ...... G06F 1/1613; G06F 1/169; G06F 1/1692; G06F 3/016; G06F 3/017; G06F 3/03547; G06F 3/038; G06F 3/041; G06F 3/0412; G06F 3/0414; G06F 3/043; G06F 3/0433; G06F 3/0436; G06F 3/044; G06F 3/0483; G06F 3/04847; G06F 3/0485; G06F 3/04883; G06F 3/04886; G06F 2203/014;
(Continued)

(56) References Cited

U.S. PATENT DOCUMENTS 8,593,409 B1 * 11/2013 Heubel ................... G06F 3/041
                                                           345/173
8,754,757 B1 *  6/2014 Ullrich .................. G06F 16/683
                                                           340/407.1

(Continued)

OTHER PUBLICATIONS

International Search Report and Written Opinion for International Application No. PCT/US2018/038969, dated Sep. 27, 2018, 10 pages.

*Primary Examiner* — Michael J Eurice
(74) *Attorney, Agent, or Firm* — Brake Hughes Bellermann LLP

(57) ABSTRACT

A system and method for dynamically cancelling haptic feedback in certain areas of a touchpad, and/or to dynamically isolating haptic feedback in certain areas of the touchpad, may enhance flexibility, utility and functionality of the touchpad. A first haptic engine may generate and transmit haptic feedback in response to an input detected in an input area of the touchpad. A second haptic engine may generate haptic cancellation feedback, and transmit the cancellation feedback after a time delay, to cancel out the effect of the haptic feedback in a cancellation area of the touchpad. This may allow a user to experience the haptic feedback in response to an input in the input area, and to rest hand(s) on other portions of the touchpad display without feeling haptic feedback in the other portions of the touchpad.

23 Claims, 14 Drawing Sheets

(51) Int. Cl.
*G06F 3/043* (2006.01)
*G06F 3/044* (2006.01)
*G06F 1/16* (2006.01)
*G06F 3/0488* (2013.01)
*G06F 3/0483* (2013.01)
*G06F 3/038* (2013.01)

(52) U.S. Cl.
CPC .......... *G06F 3/0414* (2013.01); *G06F 3/0433* (2013.01); *G06F 3/0483* (2013.01); *G06F 3/04883* (2013.01); *G06F 3/04886* (2013.01); *G06F 2203/04104* (2013.01); *G06F 2203/04105* (2013.01); *H04R 2400/03* (2013.01)

(58) Field of Classification Search
CPC . G06F 2203/04104; G06F 2203/04105; G06F 2203/04808; H04R 2400/03
See application file for complete search history.

(56) References Cited

U.S. PATENT DOCUMENTS

| | | | | |
|---|---|---|---|---|
| 9,756,604 | B1* | 9/2017 | Levesque | G08B 6/00 |
| 9,998,817 | B1* | 6/2018 | Liu | H04R 1/1041 |
| 2002/0033795 | A1* | 3/2002 | Shahoian | G06F 1/1616 |
| | | | | 345/156 |
| 2003/0235452 | A1* | 12/2003 | Kraus | B41J 5/102 |
| | | | | 400/472 |
| 2005/0162402 | A1* | 7/2005 | Watanachote | G06F 3/03547 |
| | | | | 345/173 |
| 2006/0026536 | A1* | 2/2006 | Hotelling | G06F 3/0418 |
| | | | | 715/863 |
| 2006/0197753 | A1* | 9/2006 | Hotelling | G06F 1/1626 |
| | | | | 345/173 |
| 2006/0256090 | A1* | 11/2006 | Huppi | A63F 13/02 |
| | | | | 345/173 |
| 2007/0040810 | A1* | 2/2007 | Dowe | G06F 3/0414 |
| | | | | 345/173 |
| 2007/0091070 | A1* | 4/2007 | C. Larsen | G06F 3/0213 |
| | | | | 345/168 |
| 2008/0062151 | A1* | 3/2008 | Kent | G06F 3/0418 |
| | | | | 345/177 |
| 2008/0225006 | A1* | 9/2008 | Ennadi | G06F 3/0238 |
| | | | | 345/171 |
| 2009/0085878 | A1* | 4/2009 | Heubel | G06F 3/016 |
| | | | | 345/173 |
| 2009/0273571 | A1* | 11/2009 | Bowens | G06F 3/03547 |
| | | | | 345/173 |
| 2010/0156818 | A1* | 6/2010 | Burrough | G06F 3/016 |
| | | | | 345/173 |
| 2010/0177050 | A1* | 7/2010 | Heubel | G06F 3/016 |
| | | | | 345/173 |
| 2010/0277422 | A1* | 11/2010 | Muresianu | G06F 1/1692 |
| | | | | 345/173 |
| 2011/0012717 | A1* | 1/2011 | Pance | G06F 3/016 |
| | | | | 340/407.2 |
| 2011/0038114 | A1* | 2/2011 | Pance | G06F 1/1616 |
| | | | | 361/679.4 |
| 2011/0126141 | A1* | 5/2011 | King | G06F 1/1616 |
| | | | | 715/769 |
| 2011/0193809 | A1* | 8/2011 | Walley | G06F 3/044 |
| | | | | 345/173 |
| 2011/0291976 | A1* | 12/2011 | Takada | G06F 3/016 |
| | | | | 345/173 |
| 2011/0316784 | A1* | 12/2011 | Bisutti | G06F 1/1626 |
| | | | | 345/168 |
| 2012/0075193 | A1* | 3/2012 | Marsden | G06F 3/023 |
| | | | | 345/168 |
| 2012/0117506 | A1* | 5/2012 | Koch | G06F 3/04886 |
| | | | | 715/773 |
| 2012/0126941 | A1* | 5/2012 | Coggill | G06F 21/36 |
| | | | | 340/5.54 |
| 2013/0127755 | A1* | 5/2013 | Lynn | G08B 6/00 |
| | | | | 345/173 |
| 2013/0229384 | A1* | 9/2013 | Adachi | G06F 3/041 |
| | | | | 345/174 |
| 2013/0234994 | A1* | 9/2013 | Hecht | G06F 3/043 |
| | | | | 345/177 |
| 2013/0234995 | A1* | 9/2013 | Son | G06F 3/043 |
| | | | | 345/177 |
| 2014/0055358 | A1* | 2/2014 | Birnbaum | G06F 3/016 |
| | | | | 345/168 |
| 2014/0062682 | A1* | 3/2014 | Birnbaum | G08B 6/00 |
| | | | | 340/407.2 |
| 2014/0118307 | A1* | 5/2014 | Berget | H03H 9/02535 |
| | | | | 345/177 |
| 2014/0132568 | A1* | 5/2014 | Hirose | G06F 3/016 |
| | | | | 345/175 |
| 2015/0049059 | A1* | 2/2015 | Zadesky | G06F 1/1613 |
| | | | | 345/174 |
| 2015/0067571 | A1* | 3/2015 | Marsden | G06F 17/276 |
| | | | | 715/773 |
| 2015/0070144 | A1* | 3/2015 | Weddle | G08B 6/00 |
| | | | | 340/407.1 |
| 2015/0070151 | A1* | 3/2015 | Cruz-Hernandez | G11B 27/031 |
| | | | | 340/407.1 |
| 2015/0070260 | A1* | 3/2015 | Saboune | G10L 21/16 |
| | | | | 345/156 |
| 2015/0070269 | A1* | 3/2015 | Bhatia | G06F 3/016 |
| | | | | 345/156 |
| 2015/0077373 | A1* | 3/2015 | Pance | G06F 3/016 |
| | | | | 345/173 |
| 2015/0324116 | A1* | 11/2015 | Marsden | H03K 17/9622 |
| | | | | 345/158 |
| 2016/0018890 | A1* | 1/2016 | Deokar | G06F 3/016 |
| | | | | 715/702 |
| 2016/0162031 | A1* | 6/2016 | Westerman | G06F 3/016 |
| | | | | 345/173 |
| 2016/0246376 | A1* | 8/2016 | Birnbaum | G06F 3/016 |
| 2016/0320842 | A1* | 11/2016 | Saboune | G06F 3/041 |
| 2016/0328019 | A1* | 11/2016 | Taninaka | G06F 3/016 |
| 2016/0364001 | A1* | 12/2016 | Hirose | G06F 3/0412 |
| 2017/0024013 | A1* | 1/2017 | Cruz-Hernandez | G06F 3/016 |
| 2017/0068346 | A1* | 3/2017 | Hotelling | G06F 1/1616 |
| 2017/0075424 | A1* | 3/2017 | Bernstein | G06F 3/016 |
| 2017/0255266 | A1* | 9/2017 | Holenarsipur | G06F 3/016 |
| 2017/0269786 | A1* | 9/2017 | Phipps | G06F 3/03547 |
| 2018/0011538 | A1* | 1/2018 | Rihn | G06F 3/016 |
| 2018/0173355 | A9* | 6/2018 | Rosenberg | G06F 3/0414 |
| 2018/0227063 | A1* | 8/2018 | Heubel | H04H 20/86 |

* cited by examiner

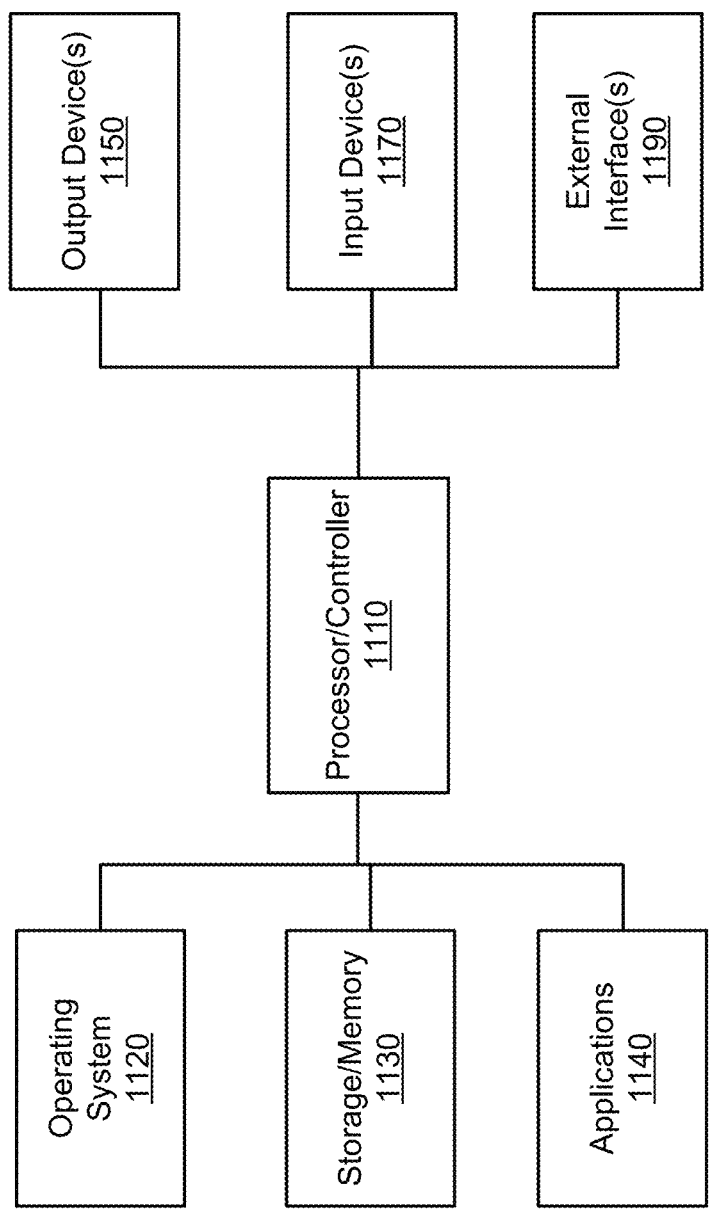

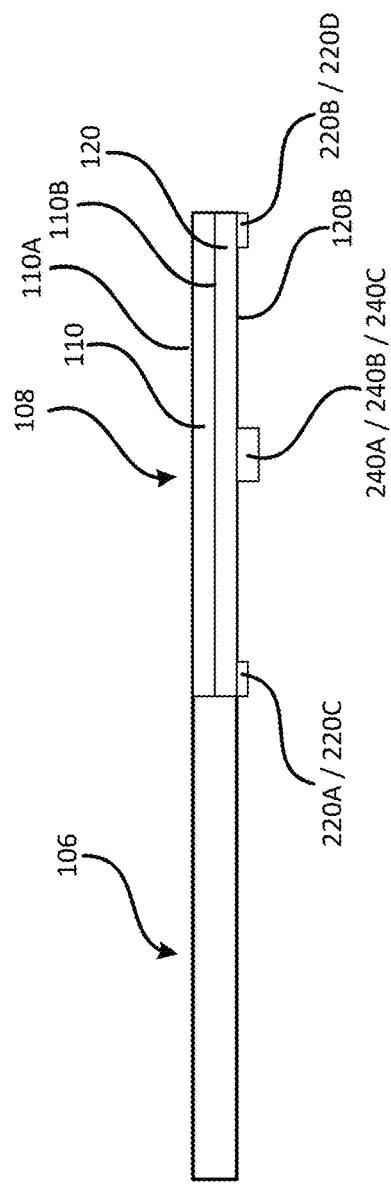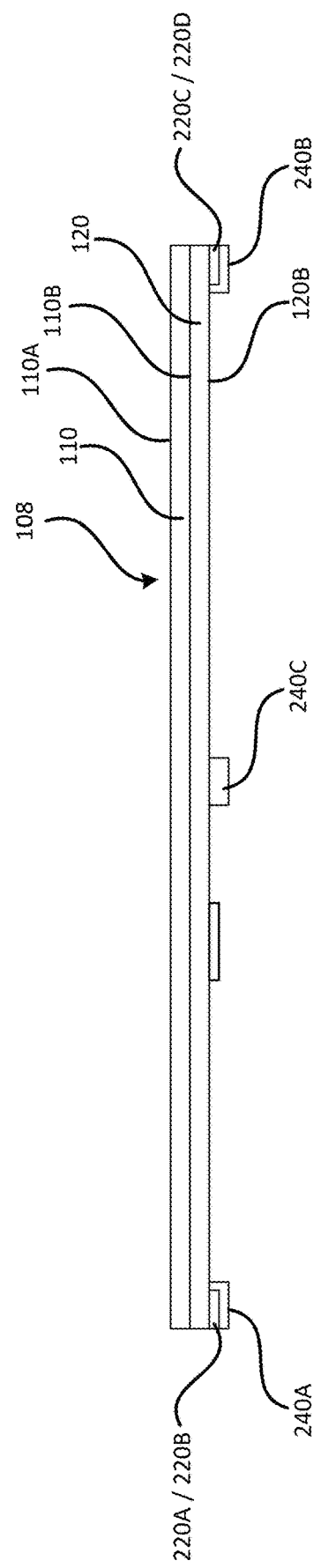
FIG. 3B
FIG. 3C

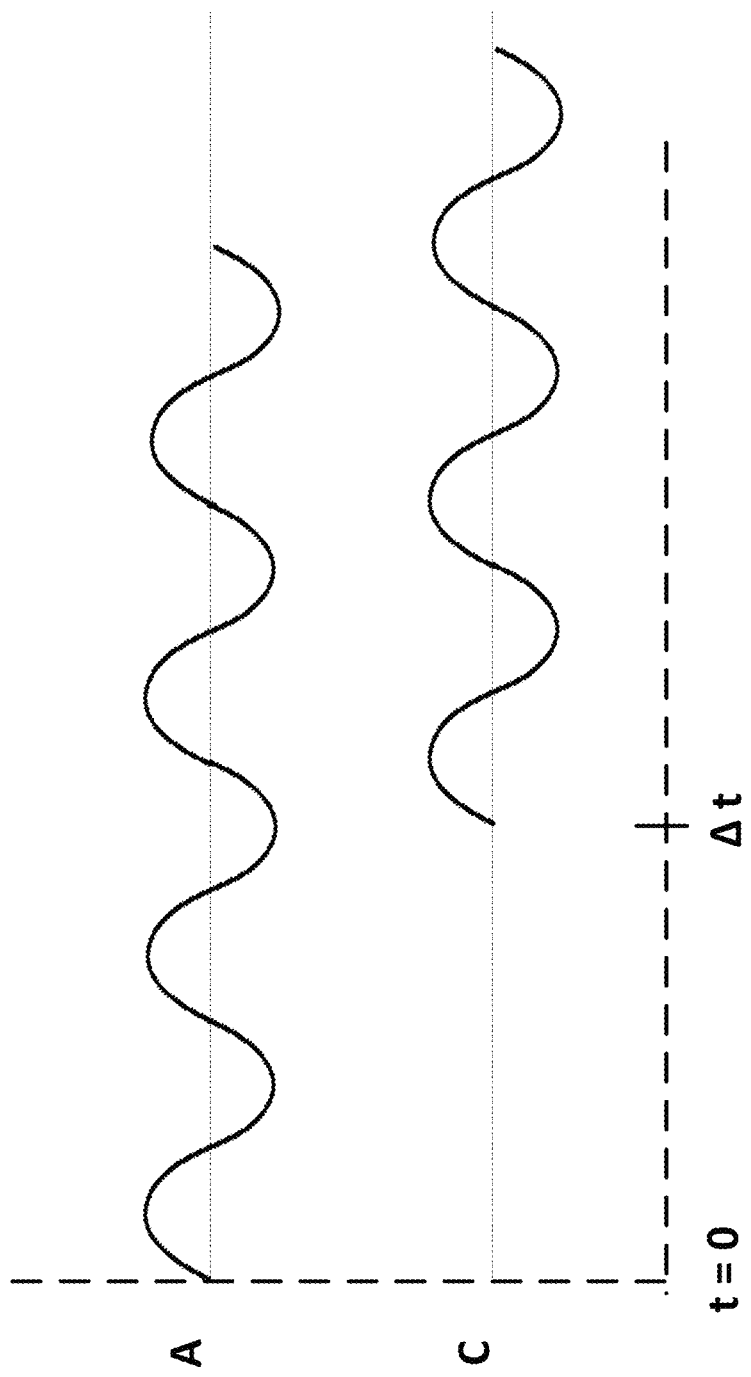

MULTI-POINT FEEDBACK CONTROL FOR TOUCHPADS

FIELD

This relates, generally, to an input device for use with a computing device.

BACKGROUND

Computing devices include one or more user input devices that allow a user to provide inputs to the computing device. Example input devices may include, for example, keyboards, mouse, trackpads, touchpads, touch displays, microphones, touch screens, and other such input devices. Example computing devices that may make use of such input devices may include, for example, portable computers, laptop computers, mobile devices (e.g., smartphones, media players, game players, mobile phones, and the like), desktop computers, and other such computing devices.

SUMMARY

According to one general aspect, method may include detecting, by a first sensor of a touchpad, an input at an input surface of the touchpad; associating the detected input with an input area of the touchpad; detecting, by a second sensor of the touchpad, a contact at the input surface of the touchpad; associating the detected contact with a cancellation area of the touchpad; transmitting, by a first haptic engine of the touchpad, a first haptic feedback signal in response to the detecting of the input in the input area; and transmitting, by a second haptic engine of the touchpad, a second haptic feedback signal in response to the detecting of the contact in the contact area, the second haptic feedback signal being an inverse of the first haptic feedback signal.

According to another general aspect, a computer program product may be embodied on a non-transitory computer readable medium. The computer readable medium may have stored thereon a sequence of instructions which, when executed by a processor, causes the processor to execute a method, the method including detecting, by a first sensor of a touchpad, an input at an input surface of the touchpad; associating the detected input with an input area of the touchpad; detecting, by a second sensor of the touchpad, a contact at the input surface of the touchpad; associating the detected contact with a cancellation area of the touchpad; transmitting, by a first haptic engine of the touchpad, a first haptic feedback signal in response to the detecting of the input in the input area; detecting that a set period of time has elapsed since the transmitting of the first haptic feedback signal; and transmitting, by a second haptic engine of the touchpad, a second haptic feedback signal in response to the detecting of the contact in the contact area, the second haptic feedback signal being an inverse of the first haptic feedback signal The details of one or more implementations are set forth in the accompanying drawings and the description below. Other features will be apparent from the description and drawings, and from the claims.

BRIEF DESCRIPTION OF THE DRAWINGS

FIG. 1B is a block diagram of an example computing device, in accordance with implementations described herein.

FIG. 3B is a cross-sectional view taken along line A-A of FIG. 3A.

FIG. 3C is a cross-sectional view taken along line B-B of FIG. 3A.

FIGS. 5A-5F illustrate cancellation of feedback in an example touchpad, in accordance with implementations described herein.

DETAILED DESCRIPTION

Figure 1A:
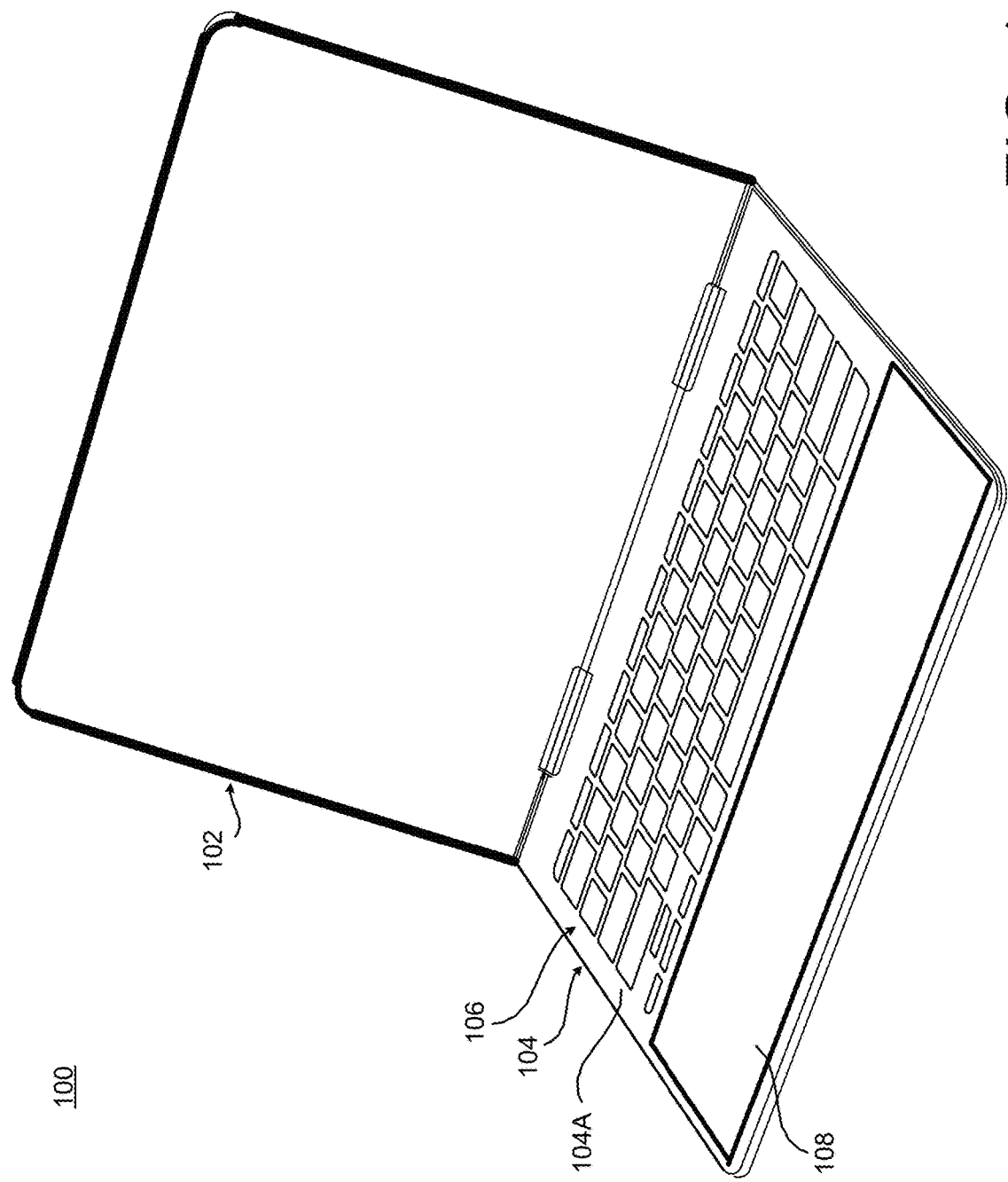
FIG. 1A is a perspective view of an example computing device including an example touchpad, in accordance with implementations described herein.

Trackpads and/or touchpads of a computing device may allow a user to provide input to the computing device through a variety of different gestures detected at an input surface of the trackpad and/or touchpad. Detection of a user's input may, for example, cause a cursor displayed on a first display (for example, a main display of the computing device, separate from the trackpad and/or touchpad) to move accordingly, cause corresponding information, graphics and the like to be displayed on the first display, trigger one or more functions of the computing device, and the like. In some implementations, at least a portion of the touchpad may include display capability, in the form of, for example, a second display (in addition to the first, or main, display discussed above) so that the touchpad is capable of both receiving input via user gestures applied at the input surface, and displaying output via the second display. Such an arrangement may, hereinafter, also be referred to as a touchpad display.

The movement of an object, such as, for example, one or more fingers, a stylus, or other instrument, at an input surface of a touchpad, or a touchpad display, may be detected by, for example, a sensor positioned at, or near the input surface. This detected movement, or gesture, may be interpreted as a command, as described above, to be implemented by the computing device. In some implementations, the sensor(s) may detect multiple points of contact with the input surface (for example, more than one point of contact with the input surface or, in some implementations, more than two points of contact with the input surface), and recognize the multiple points of contact as an input corresponding to commands to be executed by the computing device. Touch inputs may be processed to, for example, determine how many touching implements, such as, for example, fingers are sensed and/or how the touching implements are pressing and/or moving on the input surface. Such touch inputs may be detected, or sensed by, for example, capacitive sensors, resistive sensors, pressure sensors, force sensors, piezoelectric sensors, and the like. For example, one or more sensor(s), or combinations of sensor(s), may detect, for example, contact of two fingers with the input surface, and movement apart of the two fingers along the input surface, and recognize the multiple touch gesture applied to the input surface as a zoom command. In some implementations, pressure sensor(s) may detect an input based on an amount of pressure applied to the input surface, an interval of time for which a certain amount of pressure is sustained, and the like.

To provide the user with an indication, or confirmation, or non-visual feedback, touchpads may provide haptic or tactile feedback as user interface elements are navigated using the touchpad. For example, haptic feedback may be automatically provided as a user moves (e.g., swipes, slides, etc.) their finger(s) and/or stylus across the input surface, and/or as particular elements are selected and/or actuated based on the gestures detected at the input surface.

An example computing device 100, or portable computing device 100, is shown in FIG. 1A. The example computing device 100 shown in FIG. 1A includes a display portion 102 rotatably coupled to a base portion 104. The base portion 104 may include a keyboard 106 including one or more keys, and a touchpad 108. In some implementations, the touchpad 108 may be a touchpad display 108, including input components that are responsive to touch inputs applied to an input surface of the touchpad display 108, and display components to display output at the surface of the touchpad display 108. In the example arrangement shown in FIG. 1A, the keyboard 106 and the touchpad 108 occupy an upper surface 104A of the base portion 104, with the keyboard 106 occupying a first section of the upper surface 104A of the base portion 104, and the touchpad 108 occupying a second section of the upper surface 104A of the base portion 104. In the example shown in FIG. 1A, the touchpad 108 extends substantially across the full width of the base portion 104 of the computing device 100, for example, from a left peripheral portion to a right peripheral portion of the base portion 104.

The relatively large surface area of the exemplary touchpad 108 shown in FIG. 1A may provide for enhanced functionality of the touchpad 108. For example, in some implementations, the relatively large surface area of the exemplary touchpad 108 may accommodate the input and recognition of an expanded variety of gesture inputs applied to the input surface of the touchpad 108. This may expand the utility of the touchpad 108 into applications, such as, for example, graphics design applications and the like, which may benefit from the ability to input relatively long, continuous touch and drag type inputs, and the like. In some implementations, the relatively large surface area of the exemplary touchpad 108 may allow the touchpad 108 to simultaneously accommodate touch input functionality and display output functionality.

The touchpad 108 may include the ability to provide tactile, or haptic, feedback to the user, whether the touchpad 108 includes only touch input functionality, or both touch input functionality and display output functionality as in a touchpad display. This haptic feedback may provide physical feedback to the user related to, for example, a selection, an action, a position on the input surface and the like. This haptic feedback may augment, or replace the mechanical, or clicking, action sometimes associated with a mechanical trackpad/touchpad for providing physical user feedback. In an arrangement in which the touchpad 108 is relatively large (for example, extending substantially the full width of the computing device 100 as in the example shown in FIG. 1A), the user may, in some circumstances, rest portion(s) of the user's hands on the touchpad 108 while, for example, providing input via the keyboard 106 and/or the touchpad 108. If, while in this position, haptic feedback (generated as inputs are detected by the touchpad 108) was felt by the user's hands resting on the touchpad 108 (rather than just at the point of entry of the input at the input surface), this may cause the user some discomfort, or distraction, or confusion. The ability to isolate haptic feedback experienced by the user to the point(s) of input may provide the user with physical feedback confirming a specified input, without causing discomfort or distraction due to additional haptic feedback experienced in the hands. In an arrangement in which the touchpad 108 is a touchpad display, this could be achieved by segregating a touchpad input area of the touchpad 108 from a display area of the touchpad display 108. However, segregating, or segmenting, the touchpad 108 in this manner would add cost and/or complexity to the touchpad 108, and/or would limit the flexibility that would otherwise be provided by the relatively large surface area of the touchpad 108.

FIG. 1B is a block diagram of an example computing device, such as, for example, the computing device 100 shown in FIG. 1A. The example computing device 100 may include, for example, a processor/controller 1110 invoking an operating system 1120 and a storage device or memory 1130 to run various applications 1140. The computing device 100 may also include one or more output devices 1150 (such as, for example, a display, an audio output device including, for example, a speaker and/or a headphone port, and the like). The computing device 100 may also include one or more input devices 1170 (such as, for example, a keyboard, a touchpad, an audio input device including, for example, a microphone, an image capturing device and the like), and an interface device 1190 including, for example a communication port and/or interface port such as, for example, one or more USB ports, HDMI ports and the like, and other such components. The processor 1110 may process input received from the one or more input devices 1170 for execution and/or output via the one or more output devices 1150.

A system and method, in accordance with implementations described herein, may generate specific haptic feedback for the user, while minimizing usage differences between a touchpad providing haptic feedback and mechanical trackpads/touchpads providing mechanical feedback. For example, a system and method, in accordance with implementations described herein, may produce haptic feedback in a touchpad area of a touchpad that is received by the user, while cancelling out haptic feedback in other areas of the touchpad. The system and method may provide for isolation of haptic feedback, particularly in a full width touchpad, or touchpad display, employing haptic feedback motor(s) rather than mechanical clicking mechanisms.

Figure 2:
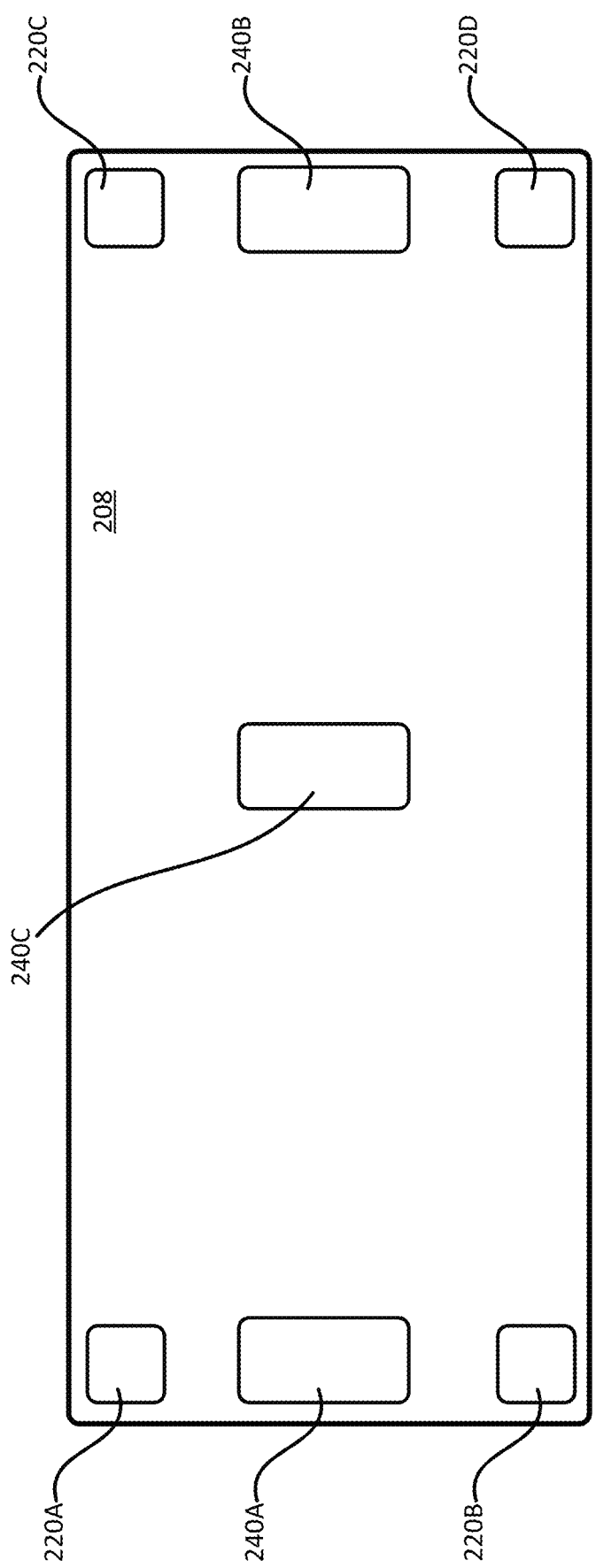
FIG. 2 is a schematic illustration of an example arrangement of components of an example touchpad, in accordance with implementations described herein.

Hereinafter, references to the touchpad 108 will include touchpads having touch input functionality, and touchpad displays having both touch input functionality and display output functionality. FIG. 2 is a schematic diagram of an exemplary arrangement of components of the example touchpad 108 included in the example computing device 100 shown in FIG. 1A. As shown in FIG. 2, the touchpad 108 may include a touch area 208, or a touch-display area 208 for a touchpad display, within which the touchpad 108 is capable of both receiving input via user gestures applied at the input surface, and displaying output in the case of the touchpad display. In some implementations, a display panel may extend across substantially the entirety of the touch-display area 208. In some implementations, a capacitive touch layer including, for example, a capacitive touch sensor, may extend across substantially the entirety of the touch-display area 208. These features will be discussed in more detail with respect to FIGS. 3A-3C.

As illustrated in the example shown in FIG. 2, a plurality of pressure sensors 220 and a plurality of haptic engines 240 may be arranged in a touch-display area 208 of the touchpad 108. In the example arrangement shown in FIG. 2, a first pressure sensor 220A is positioned at a first corner portion of the touch-display area 208, a second pressure sensor 220B is positioned at a second corner portion of the touch-display area 208, a third pressure sensor 220C is positioned at a third corner portion of the touch-display area 208, and a fourth pressure sensor 220D is positioned at a fourth corner portion of the touch-display area 208. The touchpad 108 may include more, or fewer, pressure sensors 220, in various different arrangements and/or in various different positions, or combinations of positions, in the touch-display area 208. In the example arrangement shown in FIG. 2, a first haptic engine 240A is positioned at a first lateral portion of the touch-display area 208, a second haptic engine 240B is positioned at a second lateral portion of the touch-display area 208, and a third haptic engine 240C is positioned at a central portion of the touch-display area 208. The example arrangement shown in FIG. 2 includes three haptic engines 240, simply for purposes of discussion and illustration. However, the touchpad 108 may include as few as two haptic engines 240, or more than three haptic engines 240, in various different arrangements and/or in various different positions, or combinations of positions, in the touch-display area 208.

The multiple haptic engines 240, for example, at least two haptic engines 240, or, for example, three haptic engines 240 as shown in the example in FIG. 2, may allow destructive wave interference to be implemented between adjacent haptic engines 240. This destructive wave interference between the two adjacent haptic engines 240 may create, essentially, a line (for example, in the area between the two adjacent haptic engines 240) along the touchpad 108 where no haptic feedback is experienced by the user. The ability to isolate haptic feedback to be experienced by the user to certain areas, depending on where the user applies a touch input, may be particularly useful in a case in which the display portion of the touchpad display 108 extends along essentially the full width of the computing device 100, as illustrated in the example shown in FIG. 1A.

In a full width touchpad 108, the ability to isolate haptic feedback in this manner may allow a user to, for example, rest portions of the user's hand(s) on the touchpad 108 (see FIG. 4) while, for example, using the keyboard 106 and/or touchpad 108 to provide input, without experiencing undue haptic feedback at the portion(s) of the user's hand(s) resting on the touchpad 108. Rather, haptic feedback may be isolated to, and experienced by the user, at the point of input. In this manner, the haptic feedback may provide the user with physical feedback confirming a specified input, without causing discomfort due to additional haptic feedback experienced in the hands.

The multiple pressure sensors 220, distributed in the touch-display area 208 of the touchpad 108, for example, in the exemplary manner illustrated in FIG. 2, may detect a position, or location, or where on the input surface, an input was applied to the touchpad 108. For example, the multiple pressure sensors 220 may detect where the touchpad 108 was pressed, or clicked, or tapped, or other such entry detected at the input surface of the touchpad 108. The multi-touch detection capability of the touchpad 108 may detect where the user's hand(s) are resting on the touchpad 108 (see, for example, FIG. 4). The data sensed by the multiple distributed pressure sensors 220 (related to user inputs) and the multi-touch detection capability of the touchpad 108 (to detect the position of the user's hand(s) resting on the touchpad 108), may allow the system to determine an area in which wave cancellation (between adjacent haptic engines 240) should be generated, to avoid transmission of haptic feedback to the user's hands resting on the touchpad 108.

Figure 3A:
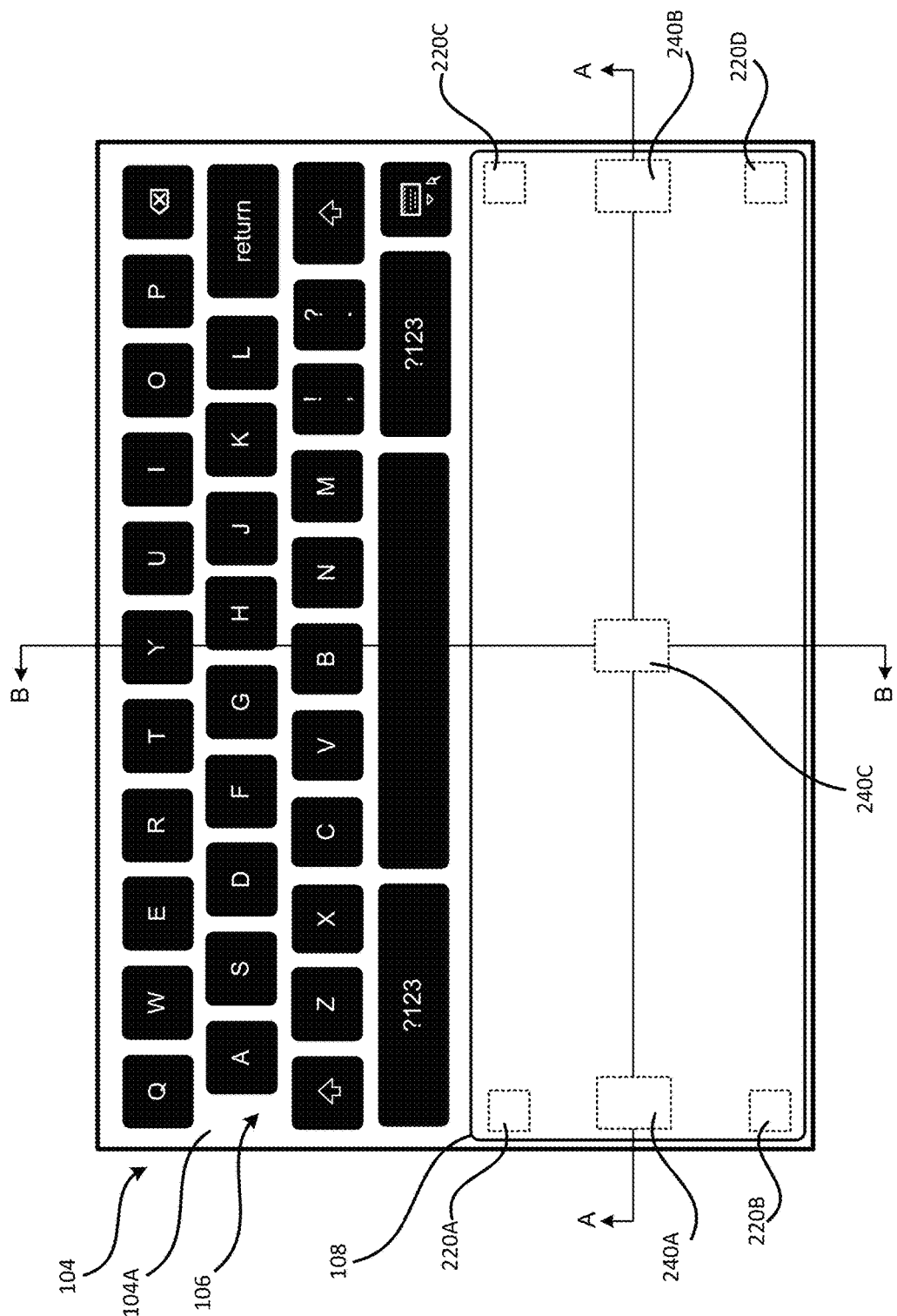
FIG. 3A is a top view of an example base portion of a computing device, in accordance with implementations described herein.

FIG. 3A is a top view of a base portion of a computing device, such as, for example, the base portion 104 of the exemplary computing device 100 shown in FIG. 1A. FIG. 3B is a cross-sectional view of the base portion 104, taken along line A-A of FIG. 3A, and FIG. 3C is a cross-sectional view of the base portion 104, taken along line B-B of FIG. 3A.

In the example base portion 104 of the computing device shown in FIGS. 1 and 3A-3C, the exemplary keyboard 106 is a physical keyboard including keys, with the keyboard 106 and the touchpad 108 occupying separate sections of the upper surface 104A of the base portion 104, simply for purposes of discussion and illustration. However, the principles described herein may be applied to other arrangements of input devices on a computing device. For example, in some implementations, the touchpad 108 may occupy a larger section of the upper surface 104A of the base portion 104, for example, a majority of the upper surface of the upper surface 104A of the base portion 104. When the touchpad 108 occupies the majority of the upper surface 104A of the base portion 104, the touchpad 108 may define a single input device, or input surface, including a keyboard input interface and a touchpad input interface, along with display capability. In this arrangement, the keyboard 106 may be a virtual keyboard that is displayed on a portion of the touchpad 108, with the virtual keyboard 106 including virtual keyboard elements (e.g., virtual keys), and the touchpad 108 detecting user key selections corresponding to touch inputs detected at the virtual elements of the virtual keyboard 106 displayed on the touchpad 108.

The example base portion 104 shown in FIGS. 3A-3C includes the touchpad 108 having a plurality of pressure sensors 220 (in this example arrangement, pressure sensors 220A, 220B, 220C and 220D) and a plurality of haptic engines 240 (in this example arrangement, haptic engines 240A, 240B and 240C), simply for purposes of discussion and illustration. However, principles to be described herein may be applied to a touchpad display 108 having more, or fewer pressure sensors 220, and/or having more, or fewer, haptic engines 240, and/or in different arrangements within the touchpad 108.

As shown in FIGS. 3A-3C, the example touchpad 108 includes a first layer 110, or an outer layer 110, or a cover layer 110, defining an input surface at an exterior facing surface 110A of the touchpad 108. A second layer 120 may be positioned adjacent to an interior facing surface 110B of the first layer 110. The first layer 110 may be, for example, transparent layer, or a glass layer including a sensor, such as, for example, a capacitive sensor. The second layer 120 may include a display panel. Images displayed on the display panel of the second layer 120 may be visible through the transparent (e.g., glass) first layer 110. The sensor(s) included in the first layer 110 may detect contact (for example, with a capacitive object such as a portion of the user's hand(s) resting on the touchpad display 108) at the exterior facing surface 110A of the first layer 110.

Pressure sensors 220 (for example, the first, second, third and fourth pressure sensors 220A, 220B, 220C and 220D) may be positioned adjacent to an interior facing surface 120B of the second layer 120. The exemplary touchpad 108 shown in FIGS. 3A-3C includes four pressure sensors 220A, 220B, 220C and 220D, respectively positioned at four corner portions of the touchpad 108. Haptic engines 240 (for example, the first, second and third haptic engines 240A, 240B and 240C) may be positioned adjacent to the interior facing surface 120B of the second layer 120. The exemplary touchpad 108 shown in FIGS. 3A-3C includes the first haptic engine 240A positioned at the first lateral portion of the touchpad 108, the second haptic engine 240B positioned at the second lateral portion of the touchpad 108, and the third haptic engine 240C positioned at the central portion of the touchpad 108.

As noted above, the sensor(s) included in the first layer 110 of the touchpad 108 may provide the touchpad 108 with multi-touch detection capability. In this manner, the system may determine a position of the user's hands, or palms, on the touchpad 108. As also noted above, the pressure sensors 220 may detect where an input has been made, or where a click has been applied to the touchpad 108. This determination may be made based on, for example, an amount of pressure detected by the pressure sensors 220, and/or an interval during which the detected pressure is sustained, and/or a location on the touchpad display at which the pressure is detected, and the like.

Figure 4:
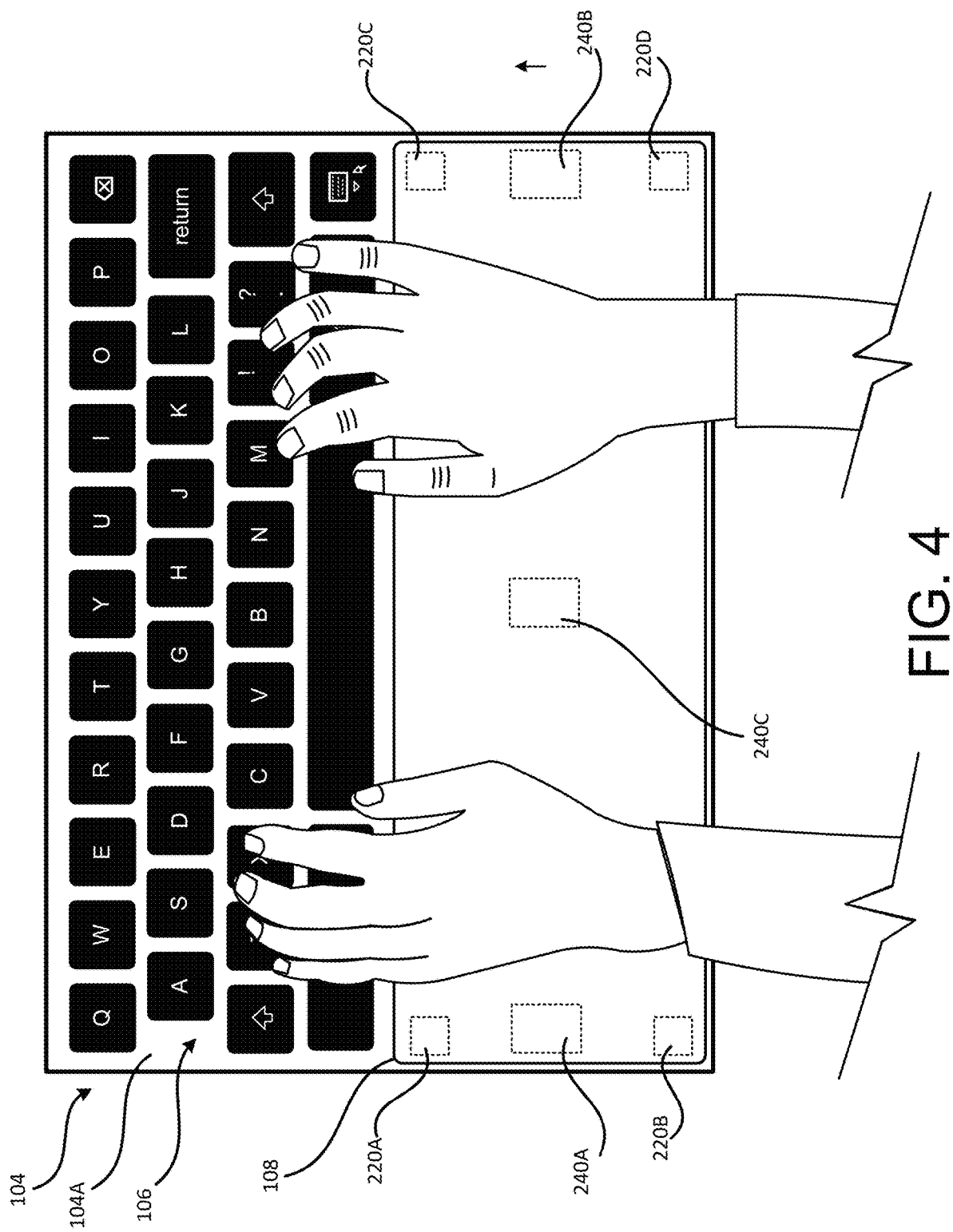
FIG. 4 is a top view of the example base portion shown in FIG. 3A, including a positioning of a user's hands relative to a touchpad and a keyboard of the base portion.

Thus, in the example illustrated in FIGS. 3A-3C and 4, the system may detect the hands of the user resting on the touchpad 108 as shown in FIG. 4, with the left hand of the user positioned between the first haptic engine 240A and the third haptic engine 240C, and the right hand of the user positioned between the second haptic engine 240B and the third haptic engine 240C. The third haptic engine 240C, at the central portion of the touchpad 108, may be actuated in response to a detected input, to generate haptic feedback. Based on the detected position of the hands of the user, the first haptic engine 240A and the second haptic engine 240A may also be actuated to generate haptic feedback, to cause the vibrations generated by the haptic feedback of the third haptic engine 240A to be cancelled out.

For example, in response to a detected input at the touchpad 108, or an intended click on the touchpad 108, which would typically cause the touchpad 108 to provide physical, haptic, feedback to the user, the third haptic engine 240C may be actuated. Vibration associated with the haptic feedback generated by the third haptic engine 240C may attenuate, for example, outward from the third haptic engine 240C across the touchpad 108. For example, vibration due to the haptic feedback generated by the third haptic engine 240C may attenuate outward from the third haptic engine 240C, toward the first haptic engine 240A, and toward the second haptic engine 240B. Without any type of cancellation effects, this vibration due to the haptic feedback generated by the third haptic engine 240C would be experienced, or felt by the hands of the user resting on the touchpad 108. This haptic feedback at the user's hands would be extraneous, or irrelevant, or disconnected from/not related to the input for which the haptic feedback is generated, thus causing the user possible discomfort, distraction and the like.

In some implementations, the first haptic engine 240A and/or the second haptic engine 240B may be actuated, so that this vibration due to the haptic feedback generated by the third haptic engine 240C is not felt by, for example, the left hand of the user positioned between the first haptic engine 240A and the third haptic engine 240C, and/or the right hand of the user positioned between the second haptic engine 240B and the third haptic engine 240C (as detected by the multi-touch sensor of the touchpad 108). For example, vibration generated due to haptic feedback generated by the first haptic engine 240A may attenuate outward, from the first haptic engine 240A, toward the third haptic engine 240C. A meeting, or intersection, of an attenuation path, or a wave, associated with the vibration from the first haptic engine 240A and an attenuation path, or wave, associated with the vibration from the third haptic engine 240C, may cause the vibration from the first haptic engine 240A and the vibration from the third haptic engine 240C to cancel each other out, so that vibration is not felt by the left hand of the user. Similarly, a meeting, or intersection, of an attenuation path, or a wave, associated with the vibration from the second haptic engine 240B and an attenuation path, or wave, associated with the vibration from the third haptic engine 240C, may cause the vibration from the second haptic engine 240B and the vibration from the third haptic engine 240C to cancel each other out, so that vibration is not felt by the right hand of the user.

The cancellation effect generated in this mode of operation of the haptic engines 240 may be considered in terms of, for example, waves generated by the haptic engines 240. That is, a first wave generated by the first haptic engine 240A, and a second wave generated by the second haptic engine 240B, may each be the inverse of a third wave generated by the third haptic engine 240C. In this manner, the first wave generated by the first haptic engine 240A may cancel out the third wave generated by the third haptic engine 240C. Similarly, the second wave generated by the second haptic engine 240B may cancel out the third wave generated by the third haptic engine 240C.

In some implementations, a frequency and/or an amplitude of the output of one or more of the haptic engines 240 may be adjusted so that cancellation occurs at the detected point at which the hand(s) of the user contact the touchpad display 108. This fine tuning of the output of the haptic engines 240 may take into account numerous factors, such as, for example, a type of output being generated, a magnitude of the output necessary to be detected, or felt, by the user, a material through which the output is to travel (and associated propagation speed through that material), positioning of the hand(s) of the user on the touchpad 108 relative to the arrangement of the haptic engines 240, and other such factors. This fine tuning of the output of the haptic engines 240 may allow for cancellation of the vibratory effects generated by the haptic engines 240 only within certain areas, while the vibratory effects may still be experienced by the user in other area(s) of the touchpad display 108 associated with a particular input warranting the physical, haptic feedback.

Figure 5A:
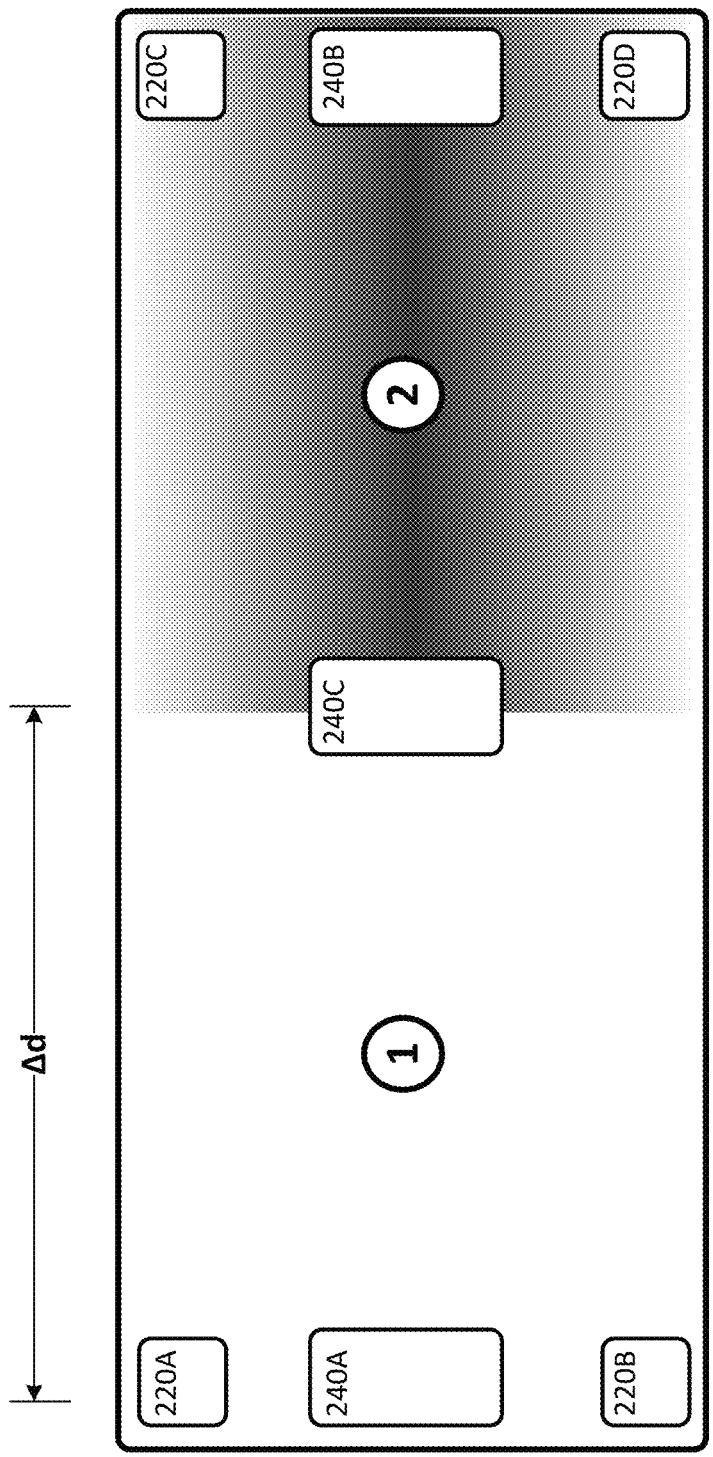

An example of this cancellation effect is illustrated in FIGS. 5A and 5B. In the example shown in FIG. 5A, an input area 1, or a click area 1, is identified between the first haptic engine 240A and the third haptic engine 240C, and a cancellation area 2 is identified between the second haptic engine 240B and the third haptic engine 240C. A distance Δd is defined between the first haptic engine 240A and the third haptic engine 240C. In this particular example, the first haptic engine 240A may generate feedback to be conveyed into the click area 1. The feedback generated by the first haptic engine 240A may be represented by the example waveform A shown in FIG. 5B. This feedback generated by the first haptic engine 240A may continue to propagate along the length of the touchpad 108, through the click area 1, and into the cancellation area 2. To cancel the effects of the feedback generated by the first haptic engine in the cancellation area 2, the third haptic engine 240C may generate feedback, after a period of time Δt has elapsed. The feedback generated by the third haptic engine 240C may be the inverse of the feedback generated by the first haptic engine 240A, thus cancelling out the effects of the feedback in the cancellation area 2. The feedback generated by the third haptic engine 240C may be represented by the example waveform C shown in FIG. 5B. The example waveform C may be the inverse of the example waveform A. As shown in FIG. 5A, cancellation effects may be strongest in the darker shaded regions of the cancellation area 2. Effective cancellation of feedback in the cancellation area 2 may rely on the determination of Δt to determine the cancellation point. If v is the propagation speed of the feedback through the material of the touchpad display 108, the period of time Δt may be determined by Equation 1.

$$\Delta t = \Delta d/v \qquad \text{Equation 1:}$$

Figure 5C:
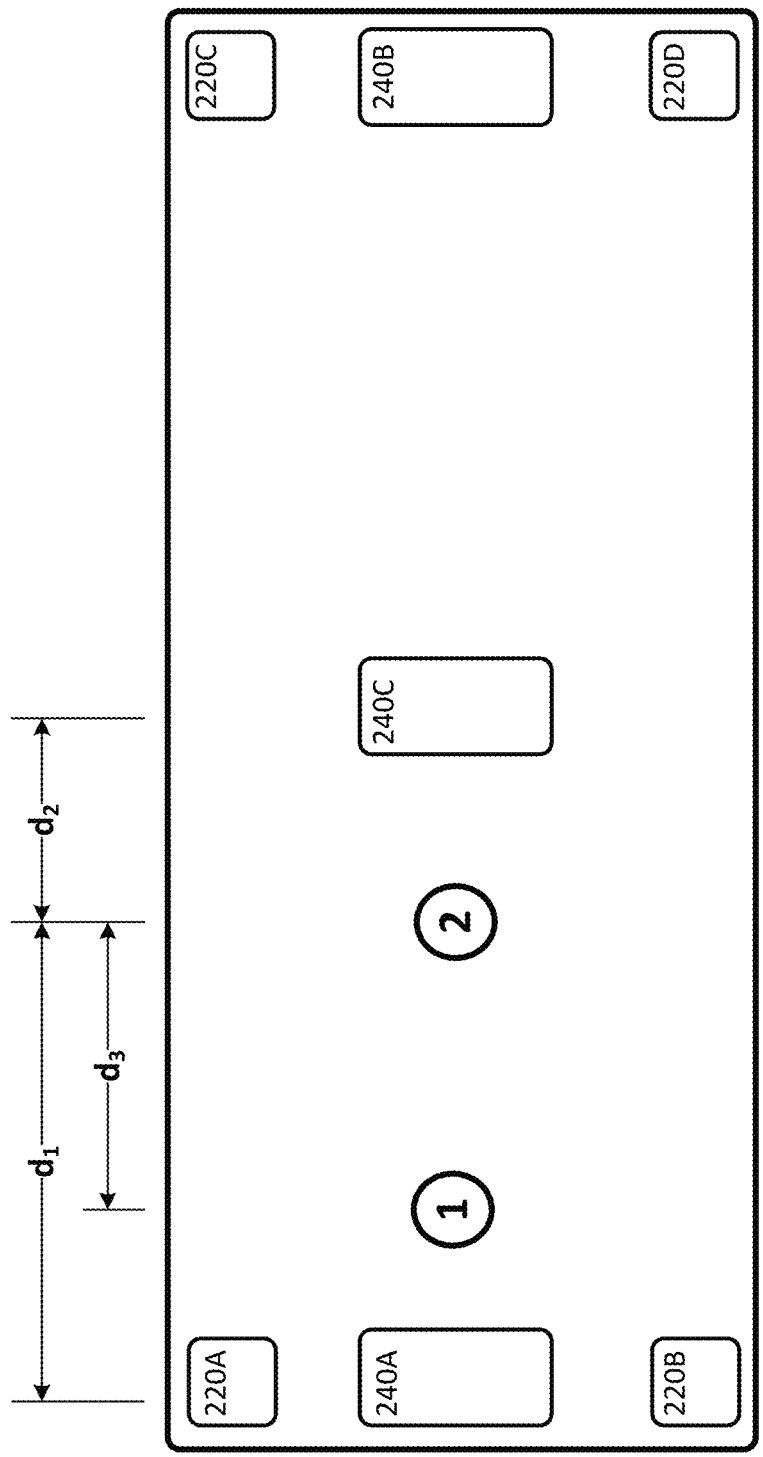

FIG. 5C illustrates an example in which the click area 1 and the cancellation area 2 are both between the first haptic engine 240A and the third haptic engine 240C. In this example, a first distance $d_1$ defines a distance between the first haptic engine 240A and the cancellation area 2, and a second distance $d_2$ defines a distance between the cancellation area 2 and the third haptic engine 240C. A third distance $d_3$ defines a distance between the click area 1 and the cancellation area 2. In this instance, Δt may be determined by Equation 1, and Δd may be determined by Equation 2.

$$\Delta d = d_1 - d_2 \qquad \text{Equation 2:}$$

Figure 5D:
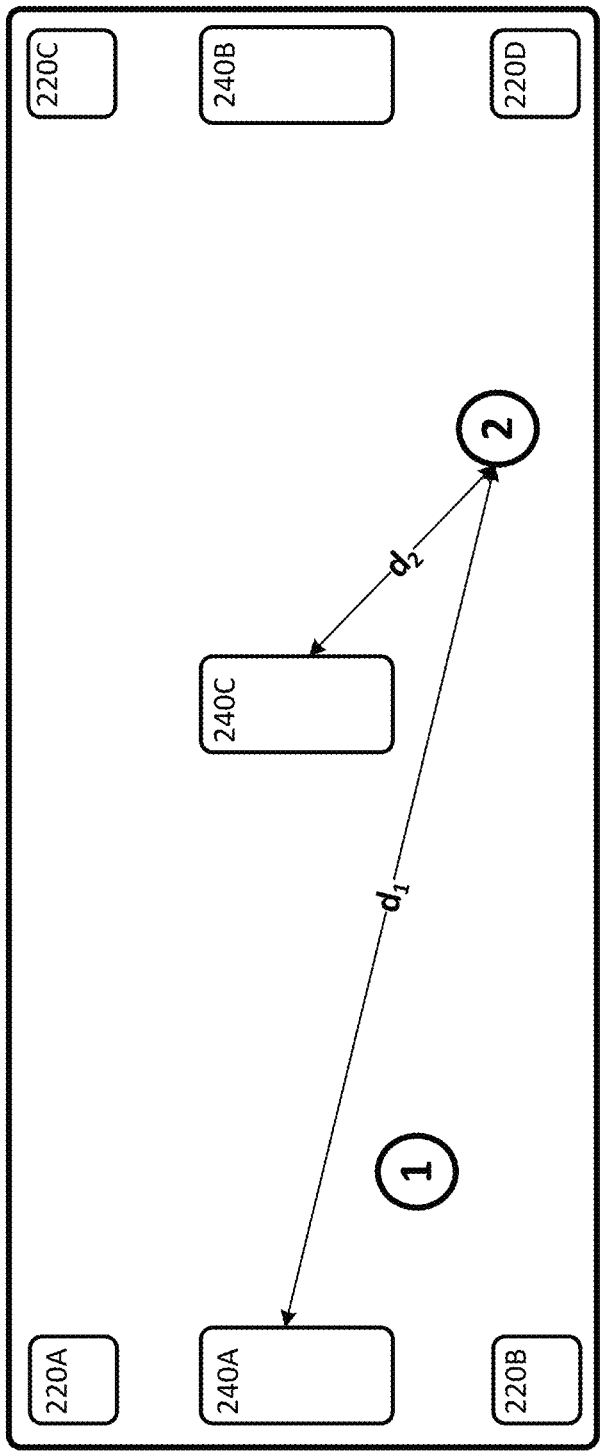
Figure 5E:
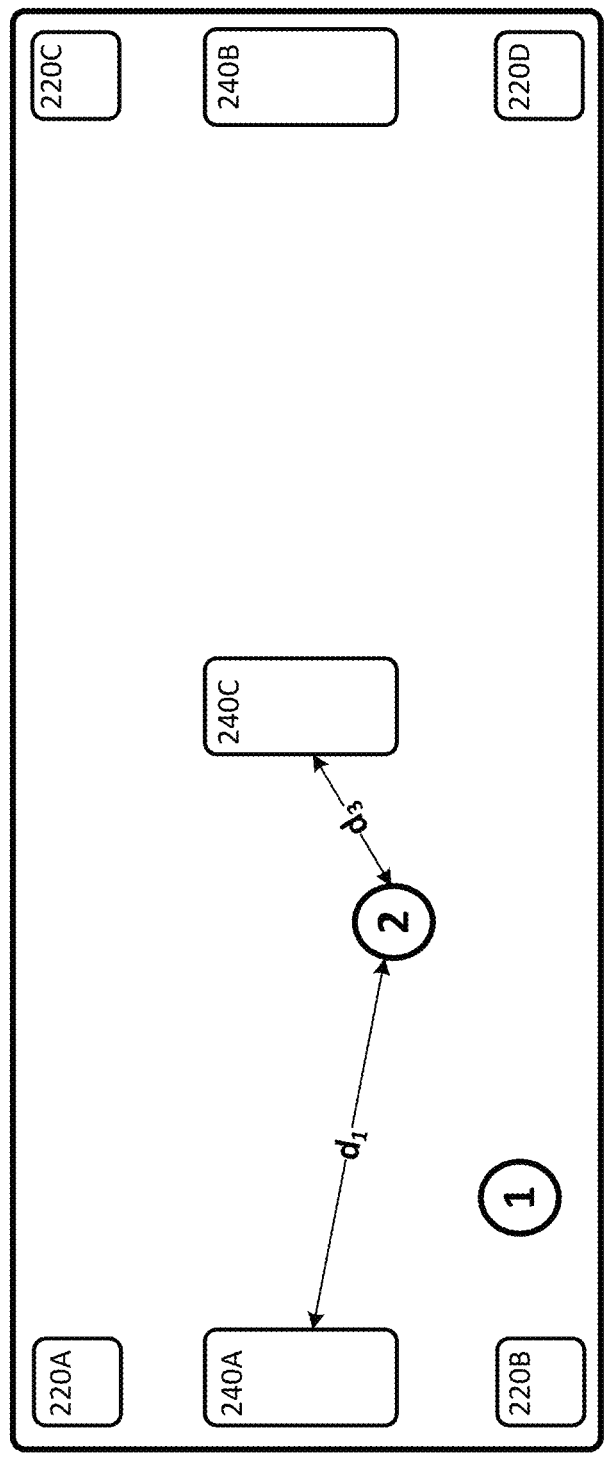

In the example shown in FIG. 5C, the first haptic engine 240A may generate feedback to be conveyed into the click area 1. To cancel the effects of the feedback generated by the first haptic engine 240A that propagate into the cancellation area 2, the third haptic engine 240C may generate feedback, after the period of time Δt has elapsed. The feedback generated by the third haptic engine 240C may be the inverse of the feedback generated by the first haptic engine 240A, thus cancelling out the effects of the feedback as the feedback approaches the cancellation area 2. In the examples shown in FIGS. 5A and 5C, the click area 1 and the cancellation area 2 are essentially in line with each other, simply for ease of discussion and illustration. FIGS. 5D and 5E illustrate examples in which the click area 1 and the cancellation area 2 are not in line with each other. In the example shown in FIG. 5D, the click area 1 is between the first haptic engine 240A and the third haptic engine 240C, and the cancellation area 2 is between the second haptic engine 240B and the third haptic engine 240C. In the example shown in FIG. 5E the click area 1 and the cancellation area 2 are both between the first haptic engine 240A and the third haptic engine 240C. In the example arrangements shown in FIGS. 5D and 5E, Δt may be determined by Equation 1 (as described above), and Δd may be determined by Equation 2 (as described above).

Figure 5F:
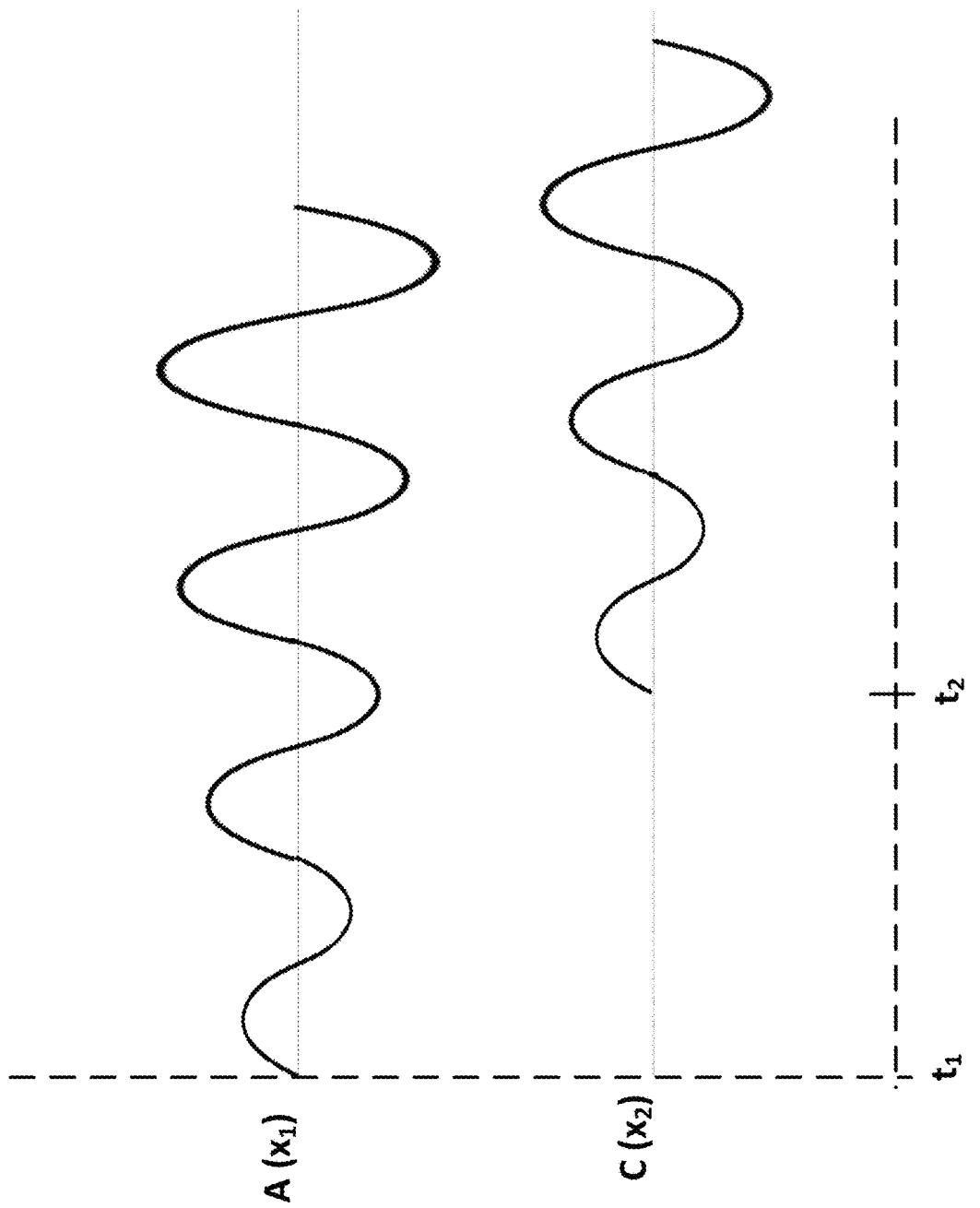

In any of these examples, the materials, properties and the like of the touchpad 108 may dampen the effect of the vibration associated with the haptic feedback generated by the haptic engine 240, and in particular the ability of the user to detect, or feel, the vibration at the click area 1. In some implementations, an amplitude of the vibration associated with the haptic feedback generated by the haptic engine(s) 240 may increase as the haptic feedback signal, or wave, propagates away from the haptic engine 240 toward the click area 1, as shown in FIG. 5F, so that the vibration associated with the haptic feedback is perceptible at the click area 1. In this example, the amplitude of the haptic feedback associated with the cancellation signal, or cancellation vibration, is also increased as the cancellation signal, or wave, propagates away from the haptic engine 240 toward the cancellation area 2, so that the vibration is not perceptible in the cancellation area 2.

In the example shown in FIG. 5F, the first waveform A (generated by the first haptic engine 240A) has a first amplitude x1, and the second waveform C (generated by the third haptic engine 240C) has an amplitude $x_2$. The time $t_1$, at which the waveform A reaches the click area 1 may be determined by the Equation 3. The time $t_2$ at which the second waveform C reaches the click area 1 may be determined by the Equation 4. In this example, the time period Δt, for waveforms having increasing amplitudes as described above with respect to FIG. 5F, may be determined by the Equation 5.

$$t_1 = (d_1 - d_3)/v \qquad \text{Equation 3:}$$

$$t_2 = (d_1 - d_2)/v + (d_2 + d_3)/v = (d_3 + d_1)/v \qquad \text{Equation 4}$$

$$\Delta t' = t_2 - t_1 \qquad \text{Equation 5}$$

Thus, in the click area 1, the amplitude $x_1$ of the first waveform A will be greater than the amplitude $x_2$ of the second (cancellation) waveform C. When the first waveform A and the second (cancellation) waveform C meet at the click area 1, the second (cancellation) waveform C had to travel the additional distance $d_3$ (the distance $d_3$ between the click area 1 and the cancellation area 2 as described above) before reaching the click area 1. Thus, in this scenario, the second (cancellation) waveform C is offset by a total of $-2*d_3/v$ with respect to the first waveform A. Thus, in addition to the first waveform A and the second (cancellation) waveform C being offset, the amplitude $x_2$ of the second (cancellation) waveform C may be lower than the amplitude $x_1$ of the first waveform A when they meet in the click area 1. In this manner, by taking into consideration the distance d between the click area 1 and the cancellation area 2, increasing the amplitude of the haptic feedback pulse, and timing the generation of the cancellation feedback pulse accordingly, cancellation effects will be reduced at the click area 1, so that haptic feedback is perceptible to the user at the click area 1, and not perceptible to the user at the cancellation area 2.

As noted above, essentially complete cancellation may be achieved with an accurate determination of Δt and propagation of the cancellation feedback along the corresponding vector. In some implementations, effective dampening may be achieved, even when cancellation feedback that does not strictly follow the corresponding vector. For example, an offset of, for example, π/8 between the propagation of the feedback wave (for example, the waveform A as described above) and the propagation of the feedback cancellation wave (for example, the waveform C as described above) may produce a dampening effect of approximately 60% or greater, particularly when propagating through a material such as the glass of the touchpad display 108.

In some implementations, an additional time offset may be applied to the transmission of the second waveform C (i.e., the cancellation wave), to further decrease the cancellation effect in the click area 1 (i.e., to increase the amount of haptic feedback experienced by the user in the click area 1). In some situations, this may also increase the effect of the haptic feedback in the cancellation area 2. The effect of the second waveform C (i.e., the cancellation wave) in the click area 1, and the effect of the haptic feedback associated with the first waveform A in the cancellation area 2 generated by a particular time offset may be balanced based on, for example, a particular work environment, application, user preferences, and the like. Similarly, In some situations, the dampening properties of the material of the touchpad 108, and/or the minimum threshold of amplitude that may be perceptible by the user in the cancellation area 2, may allow for an additional small time offset to be applied to the transmission of the second waveform C (i.e., the cancellation wave), without an appreciable difference notice by the user in the cancellation area 2.

The ability to dynamically cancel haptic feedback in certain areas of the touchpad 108, and/or to dynamically isolate, haptic feedback in certain areas of the touchpad 108 enhances flexibility, utility and functionality of the touchpad 108. That is, the ability to dynamically control haptic feedback in certain areas of the touchpad 108 allow input areas and output areas of the touchpad 108 to be dynamically interchangeable. That is, areas of the touchpad 108 are no longer limited to either input receiving capability or output display capability. Rather, essentially the entirety of the touchpad 108 can function to display output to the user, and essentially the entirety of the touchpad 108 can function to receive input from the user, without the user experiencing undue haptic feedback.

Figure 6:
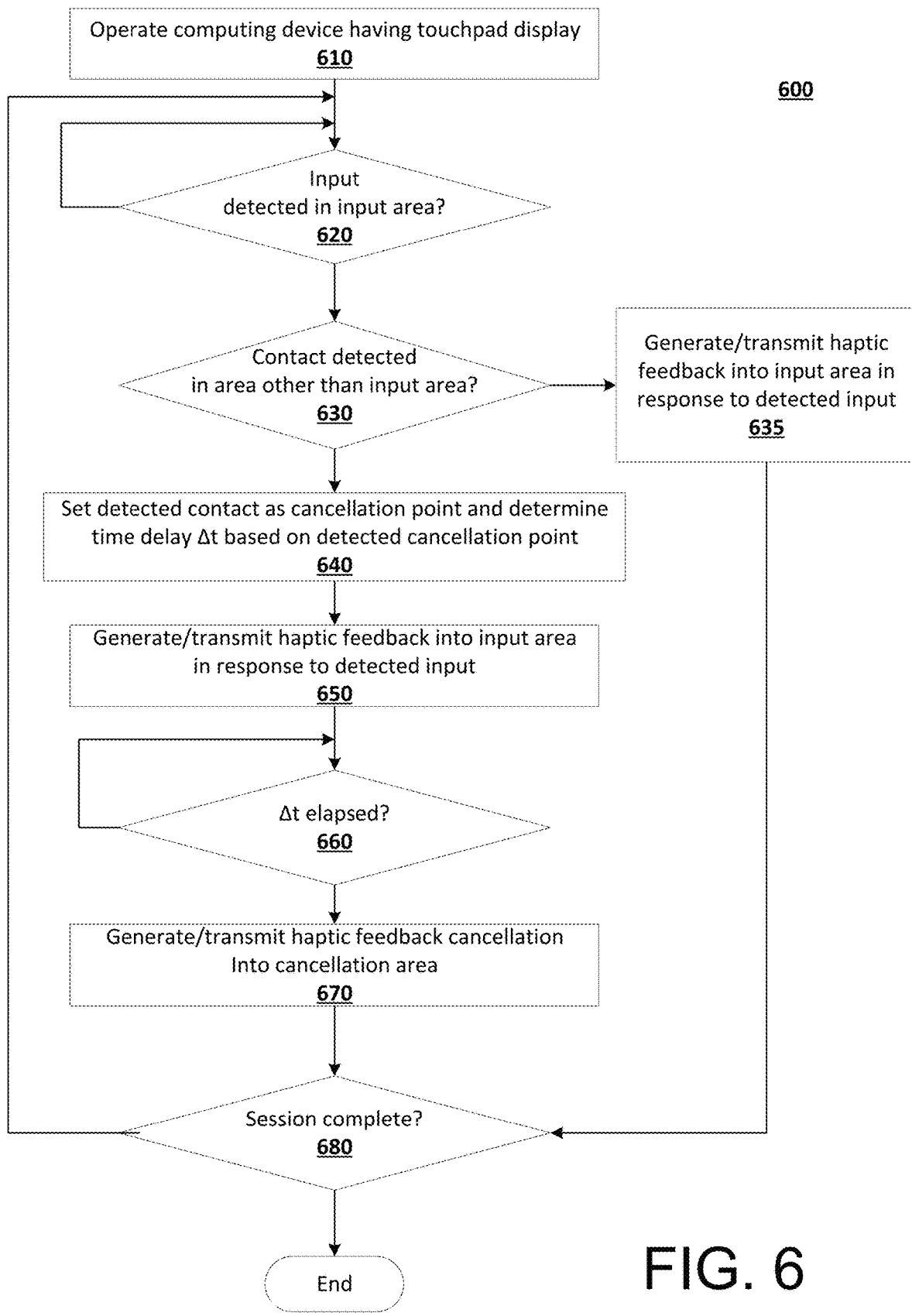
FIG. 6 is a flowchart of an example method that may be implemented using machine-readable instructions executed by one or more processors to provide haptic feedback, in accordance with implementations described herein.

An example method 600 is shown in FIG. 6. The example method may be performed to provide haptic feedback, and to dynamically cancel, and/or dynamically isolate, haptic feedback, in accordance with implementations described herein. A computing device, such as, for example, the example computing device 100 including the touchpad 108 as described above, is operated (block 610), and it is determined whether an input has been detected in an input area of the touchpad (block 620). The detection of an input in the input area may be, for example, a touch input by a user at or near an input surface of the touchpad. It is then determined whether contact with the touchpad is detected in an area other than the input area (block 630). If contact is not detected in an area other than the input area, then haptic feedback may be generated to provide a physical indication, or physical feedback, of the detected input in the input area (block 635). This haptic feedback may be generated and transmitted by, for example, a first haptic engine included in the touchpad.

The detection of contact in an area other than the input area may be a contact by, for example, a sensor, for example, a multi-touch capacitive sensor, of the touchpad, that is recognized as, for example, portion(s) of a hand of a user resting on the touchpad. Detection of such contact in an area outside of the input area may define a cancellation point, or cancellation area, in which haptic feedback (for example, the haptic feedback to be generated by the first haptic engine in response to the detected input in the input area) is to be cancelled. In response to detection of contact in an area other than the input area (block 630), a point at which the contact is detected may be set as a cancellation point, or a cancellation area, and a time delay Δt may be set for transmission of haptic cancellation feedback by a second haptic engine (block 640). Haptic feedback may be generated, by for example, the first haptic engine included in the touchpad, to provide a physical indication, or physical feedback, of the detected input in the input area (block 650). After the time delay Δt has elapsed (block 660), haptic cancellation feedback may be generated by, for example, a second haptic engine included in the touchpad, to cancel the effect of the haptic feedback (generated by the first haptic engine) in the cancellation area (block 670). The haptic cancellation feedback generated and transmitted by the second haptic engine may be the inverse of the haptic feedback generated and transmitted by the first haptic engine, so that the effect of the haptic feedback from the first haptic engine is cancelled out as it meets the haptic feedback from the second haptic engine in the cancellation area. This process may continue until it is determined that a session is complete (block 680).

Figure 7:
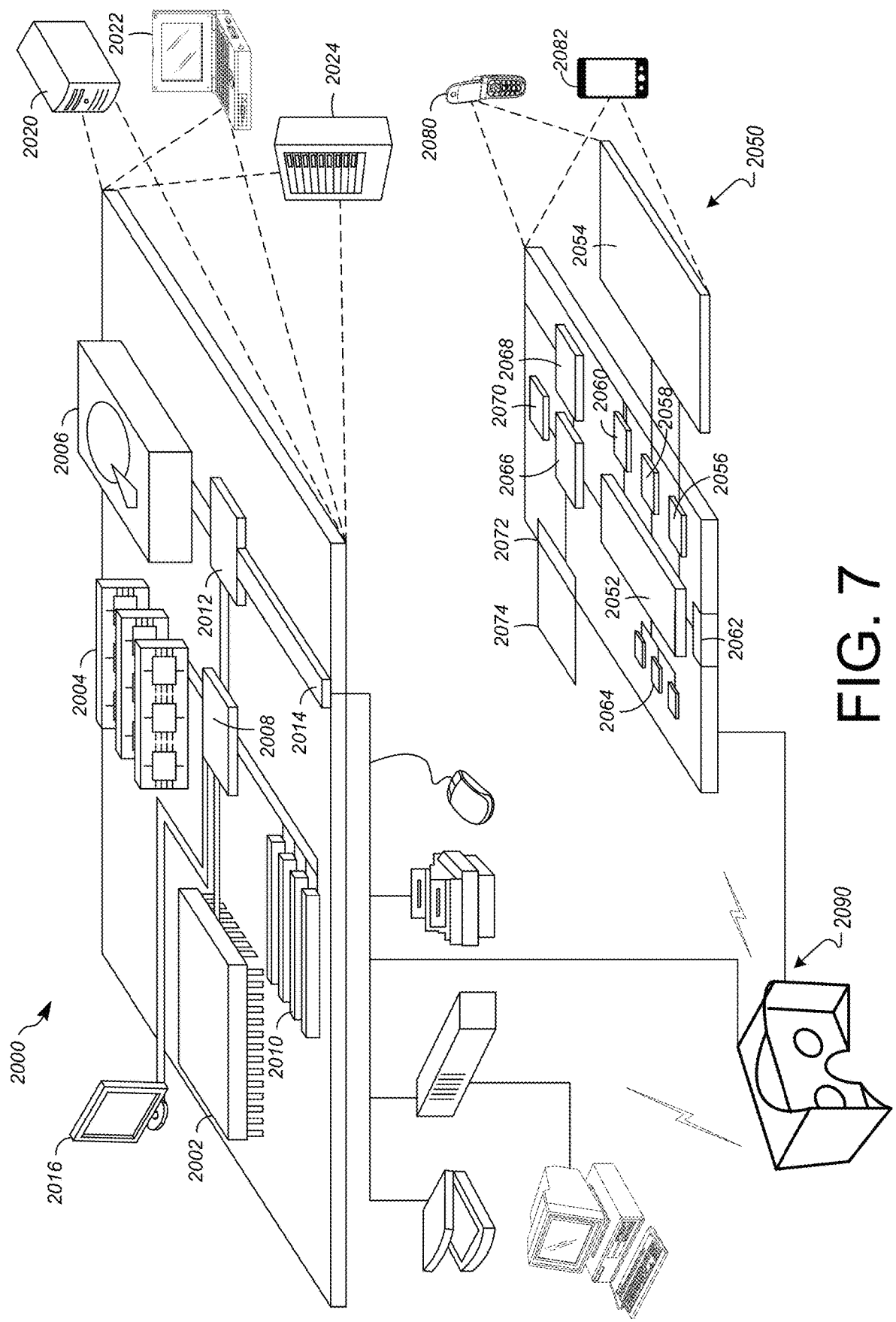
FIG. 7 illustrates an example of a computer device and a mobile computer device that can be used to implement the techniques described herein.

FIG. 7 illustrates an example of a computer device 2000 and a mobile computer device 2050, which may be used with the techniques described here. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 20 can include sensors that interface with a virtual reality (VR) headset 2090, or head mounted display device 2090. For example, one or more sensors included on a computing device 2050 or other computing device depicted in FIG. 20, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control virtual objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR environment on the computing device 2050 or on the VR headset 2090.

In some implementations, a computing device 2050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning and/or flipping a page of the virtual book. As each page is turned and/or flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers and devices, including, but not limited to laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of operating a touchpad including a plurality of haptic engines, comprising:
   detecting an input at an input surface of the touchpad;
   associating the detected input with an input area of the touchpad;
   detecting a contact at the input surface of the touchpad;
   associating the detected contact with a cancellation area of the touchpad;
   transmitting, by one haptic engine of the plurality of haptic engines of the touchpad, a first haptic feedback signal in response to the detecting of the input in the input area; and
   transmitting, by an other haptic engine of the plurality of haptic engines of the touchpad, a second haptic feedback signal in response to the detecting of the contact in the cancellation area, the second haptic feedback signal being an inverse of the first haptic feedback that cancels a haptic effect of the first haptic feedback signal in the cancellation area of the touchpad, including:
      determining a time delay based on a position of the cancellation area on the touchpad, the time delay defining a period of time;
      detecting that the period of time has elapsed after transmitting the first haptic feedback signal; and
      transmitting the second haptic feedback signal after detecting that the period of time has elapsed after transmitting the first haptic feedback signal.

2. The method of claim 1, wherein detecting the contact at the input surface of the touchpad includes:
   detecting, by a multi-touch sensor of the touchpad, the contact at the input surface of the touchpad; and
   detecting a contact area associated with the detected contact on the input surface.

3. The method of claim 2, wherein associating the detected contact with the cancellation area of the touchpad includes:
   matching the detected contact and the associated contact area with a known multi-touch contact; and
   setting a portion of the touchpad at which the contact area and associated contact is detected as the cancellation area in response to the matching.

4. The method of claim 1, wherein detecting the input at the input surface of the touchpad includes:
   detecting, by one or more pressure sensors of the touchpad, a touch input at the input surface of the touchpad;
   detecting an input force associated with the detected touch input; and
   detecting a gesture associated with the detected touch input.

5. The method of claim 4, wherein associating the detected input with the input area of the touchpad includes:
   detecting at least one characteristic associated with the detected gesture;
   matching the detected gesture with an input command based on the detected at least one characteristic and the detected input force; and
   setting a portion of the touchpad at which the gesture is detected as the input area.

6. The method of claim 5, wherein the at least one characteristic includes at least one of a detected touch input pattern detected on the input surface of the touchpad, a period of time for which the detected gesture is sustained on the input surface of the touchpad, and the detected input force.

7. The method of claim 1, wherein the plurality of haptic engines includes a first haptic engine generating the first haptic feedback signal, a second haptic engine, and a third haptic engine positioned between the first haptic engine and the second haptic engine, the third haptic engine generating the second haptic feedback signal, and wherein determining the period of time defining the time delay includes:
   detecting a first distance d1 between the first haptic engine and the cancellation area;
   detecting a second distance d2 between the third haptic engine and the cancellation area; and
   determining a difference $\Delta d$ between the first distance d1 and the second distance d2.

8. The method of claim 7, wherein determining the period of time defining the time delay also includes:
   dividing the difference $\Delta d$ by a propagation speed v of the first haptic feedback signal and the second haptic feedback signal through the touchpad; and
   setting the period of time equal to the quotient of the difference $\Delta d$ divided by the propagation speed v.

9. The method of claim 7, wherein determining the period of time defining the time delay also includes:
   determining a third distance d3 between the input area and the cancellation area;
   dividing the third distance d3 by a propagation speed v of the first haptic feedback signal and the second haptic feedback signal through the touchpad; and
   setting the period of time equal to the quotient of the third distance d3 divided by the propagation speed v.

10. The method of claim 7, wherein transmitting the first haptic feedback signal in response to the detecting of the input in the input area, and transmitting the second haptic feedback signal in response to the detecting of the contact in the cancellation area includes:
    transmitting the first haptic feedback signal such that the first haptic feedback signal propagates outward from the first haptic engine toward the input area; and
    after detecting that the period of time has elapsed from the transmitting of the first haptic feedback signal, transmitting the second haptic feedback signal such that the second haptic feedback signal propagates outward from the third haptic engine toward the cancellation area,
    wherein the second haptic feedback signal is the inverse of the first haptic feedback signal, such that the second haptic feedback signal cancels out the first haptic feedback signal as the first haptic feedback signal continues to propagate and the first haptic signal and the second haptic feedback signal meet in the cancellation area.

11. The method of claim 10, wherein
transmitting the first haptic feedback signal includes transmitting the first haptic signal at an increasing amplitude as the first haptic feedback signal propagates outward from the first haptic engine, and
transmitting the second haptic feedback signal includes transmitting the second haptic signal at an increasing amplitude as the second haptic feedback signal propagates outward from the third haptic engine.

12. The method of claim 11, wherein the amplitude of the first haptic feedback signal in the input area is greater than the amplitude of the second haptic feedback signal in the input area, such that the second haptic feedback signal does not cancel out the first haptic signal in the input area and the first haptic feedback signal generates detectable haptic feedback at the input area of the touchpad.

13. A computer program product embodied on a non-transitory computer readable medium, the computer readable medium having stored thereon a sequence of instructions which, when executed by a processor, causes the processor to execute a method, the method comprising:
detecting an input at an input surface of a touchpad;
associating the detected input with an input area of the touchpad;
detecting a contact at the input surface of the touchpad;
associating the detected contact with a cancellation area of the touchpad;
transmitting, by a one haptic engine, of a plurality of haptic engines of the touchpad, a first haptic feedback signal in response to the detecting of the input in the input area;
determining a time delay based on a position of the cancellation area on the touchpad, the time delay defining a period of time;
detecting that the period of time has elapsed since the transmitting of the first haptic feedback signal; and
transmitting, by an other haptic engine of the plurality of haptic engines of the touchpad, after detecting that the period of time has elapsed since the transmitting of the first haptic feedback signal, a second haptic feedback signal in response to the detecting of the contact in the cancellation area, the second haptic feedback signal being an inverse of the first haptic feedback signal that cancels a haptic effect of the first haptic feedback signal in the cancellation area of the touchpad.

14. The computer program product of claim 13, wherein detecting the input at the input surface of the touchpad and associating the detected input with the input area of the touchpad includes:
detecting, by one or more pressure sensors of the touchpad, a touch input at the input surface of the touchpad;
detecting a gesture associated with the detected touch input;
detecting an input force associated with the detected touch input;
matching the detected gesture and the detected input force with an input command; and
setting a portion of the touchpad at which the gesture is detected as the input area of the touchpad.

15. The computer program product of claim 13, wherein detecting the contact at the input surface of the touchpad includes:
detecting, by a multi-touch sensor of the touchpad, the contact at the input surface of the touchpad;
detecting a contact area associated with the detected contact on the input surface;
matching the detected contact and the associated contact area with a known multi-touch contact; and
setting a portion of the touchpad at which the contact area and associated contact is detected as the cancellation area of the touchpad in response to the matching.

16. The computer program product of claim 13, wherein determining the time delay defining the period of time includes:
detecting a first distance d1 between the one haptic engine and the cancellation area;
detecting a second distance d2 between the other haptic engine and the cancellation area;
determining a difference Δd between the first distance d1 and the second distance d2;
dividing the difference Δd by a propagation speed v of the first haptic feedback signal and the second haptic feedback signal through the touchpad; and
setting the period of time equal to the quotient of the difference Δd divided by the propagation speed v.

17. The computer program product of claim 16, detecting that the period of time has elapsed since the transmitting of the first haptic feedback signal includes defining the period of time, including:
determining a third distance d3 between the input area and the cancellation area;
dividing the third distance d3 by a propagation speed v of the first haptic feedback signal and the second haptic feedback signal through the touchpad; and
setting the period of time equal to the quotient of the third distance d3 divided by the propagation speed v.

18. The computer program product of claim 13, wherein transmitting the first haptic feedback signal in response to the detecting of the input in the input area, and transmitting the second haptic feedback signal in response to the detecting of the contact in the cancellation area includes:
transmitting the first haptic feedback signal such that the first haptic feedback signal propagates outward from the one haptic engine toward the input area; and
after the period of time has elapsed, transmitting the second haptic feedback signal such that the second haptic feedback signal propagates outward from the other haptic engine toward the cancellation area,
wherein the second haptic feedback signal is the inverse of the first haptic feedback signal, such that the second haptic feedback signal cancels out the first haptic feedback signal as the first haptic feedback signal continues to propagate and the first haptic signal and the second haptic feedback signal meet in the cancellation area.

19. The computer program product of claim 18, wherein
transmitting the first haptic feedback signal includes transmitting the first haptic signal at an increasing amplitude as the first haptic feedback signal propagates outward from the one haptic engine, and
transmitting the second haptic feedback signal includes transmitting the second haptic signal at an increasing amplitude as the second haptic feedback signal propagates outward from the other haptic engine, and
wherein the amplitude of the first haptic feedback signal in the input area is greater than the amplitude of the second haptic feedback signal in the input area, such that the second haptic feedback signal does not cancel out the first haptic signal in the input area and the first haptic feedback signal generates detectable haptic feedback at the input area of the touchpad.

20. A computing device, comprising:
a base;
a touchpad extending from a first lateral side portion of the base to a second lateral side portion of the base, the first lateral side portion of the base being opposite the second lateral side portion of the base, the touchpad including:
an input surface;
a plurality of pressure sensors arranged in communication with the input surface;
a capacitive sensor in communication with the input surface; and
a plurality of haptic engines arranged in communication with the input surface; and
a processor configured to control the plurality of haptic engines of the touchpad in response to inputs detected at the input surface, wherein the processor is configured to:
associate an input detected by one or more of the plurality of pressure sensors with an input area of the touchpad;
associate a contact detected by the capacitive sensor with a cancellation area of the touchpad;
control one haptic engine, of the plurality of haptic engines, to transmit a first haptic feedback signal in response to the detected input in the input area;
determine a time delay based on a position of the cancellation area on the touchpad, the time delay defining a period of time; and
control an other haptic engine, of the plurality of haptic engines, to transmit a second haptic feedback signal, after the period of time has elapsed, in response to the detected contact in the cancellation area, wherein the second haptic feedback signal is an inverse of the first haptic feedback signal that cancels a haptic effect the first haptic feedback signal in the cancellation area of the touchpad.

21. The computing device of claim 20, wherein the plurality of pressure sensors includes:
a first pressure sensor in a first corner portion of the touchpad;
a second pressure sensor in a second corner portion of the touchpad;
a third pressure sensor in a third corner portion of the touchpad; and
a fourth pressure sensor in a fourth corner portion of the touchpad; and the plurality of haptic engines includes:
the first haptic engine at a first lateral side portion of the touchpad;
a second haptic engine at a central portion of the touchpad; and
the third haptic engine at a second lateral side portion of the touchpad, the second lateral side portion of the touchpad being opposite the first lateral side portion of the touchpad, with the second haptic engine is positioned between the first haptic engine and the third haptic engine.

22. The computing device of claim 20, wherein, in controlling the determining the time delay, the processor is configured to:
determine a first distance $d1$ between the one haptic engine and the cancellation area;
determine a second distance $d2$ between the other haptic engine and the cancellation area;
determine a difference $\Delta d$ between the first distance $d1$ and the second distance $d2$; and
set the period of time equal to a quotient of the difference $\Delta d$ divided by a propagation speed $v$ of the first haptic feedback signal and the second haptic feedback signal through the touchpad.

23. The computing device of claim 20, wherein in transmitting the first haptic feedback signal in response to the detecting of the input in the input area, and transmitting the second haptic feedback signal in response to the detecting of the contact in the cancellation area, the processor is configured to control the one haptic engine and the other haptic engine to:
transmit the first haptic feedback signal such that the first haptic feedback signal propagates outward from the one haptic engine toward the input area; and
after the period of time has elapsed, transmit the second haptic feedback signal such that the second haptic feedback signal propagates outward from the other haptic engine toward the cancellation area,
wherein the second haptic feedback signal is the inverse of the first haptic feedback signal, such that the second haptic feedback signal cancels out the first haptic feedback signal as the first haptic feedback signal continues to propagate and the first haptic signal and the second haptic feedback signal meet in the cancellation area.

* * * * *